United States Patent [19]

Noe et al.

[11] 4,417,465
[45] Nov. 29, 1983

[54] PORTABLE TEST UNIT, FOR HIGH PRESSURE TESTING OF TUBES

[76] Inventors: Renato R. Noe, 1609 West St., Union City, N.J. 07087; Michael C. Catapano, 422 St. Pauls Ave., Jersey City, N.J. 07306

[21] Appl. No.: 325,961

[22] Filed: Nov. 30, 1981

[51] Int. Cl.³ ............................................. G01M 3/28
[52] U.S. Cl. .................................. 73/49.5; 73/40.5 R
[58] Field of Search ...................... 73/49.5, 49.6, 49.1, 73/40.5 R

[56] References Cited

U.S. PATENT DOCUMENTS

| | | | |
|---|---|---|---|
| 3,436,957 | 4/1969 | Pridy | 73/40.5 R |
| 3,495,443 | 2/1970 | Phillips et al. | 73/40.5 R |
| 3,710,628 | 1/1973 | Horton | 73/49.5 |
| 3,756,072 | 9/1973 | MacMurray | 73/49.1 X |
| 3,800,596 | 4/1974 | Phillips et al. | 73/40.5 R |
| 3,810,383 | 5/1974 | Matherne | 73/40.5 R |

*Primary Examiner*—Gerald Goldberg
*Assistant Examiner*—Joseph W. Roskos
*Attorney, Agent, or Firm*—Bernard J. Murphy

[57] ABSTRACT

The unit comprises a mobile chassis having an enclosure mounted thereon, in which enclosure are compactly and efficiently confined an air-operated hydraulic pump, a water conduit for admitting water to the pump and for discharging pressured water therefrom, and a compressed-air conduit, for admitting operative compressed air to the pump, together with a pressure regulator for the air. The enclosure has a control panel through the face of which are mounted air and water inlet connectors for the conduits, and a water outlet connector. Air and water inlet valves, interposed in the conduits, are also mounted on the control panel, as well as a water discharge valve; the latter is interposed in the discharge end of the water conduit. Finally, air and water pressure-indicators, which communicate with the respective conduits, are fixed in the panel, and a pressure-setting regulator, which communicates with the air conduit, is secured in the panel.

4 Claims, 3 Drawing Figures

PORTABLE TEST UNIT, FOR HIGH PRESSURE TESTING OF TUBES

This invention pertains to the high-pressure testing of tubes, such as tubes in tube-and-shell heat exchangers, and the like, and in particular to a portable test unit for hydraulic, high-pressure testing of such tubes, which compactly provides water and compressed gas connections, controls, and pressure sensors in a unitized, trans-portable package. It is particularly an object of this invention to set forth a portable test unit, for high-pressure testing of tubes, comprising a chassis; an enclosure coupled to said chassis; a power-operative hydraulic pump secured within said enclosure; first means for supplying operative power to said pump; second means coupled to said first means for selectively controlling the power supplied by said first means to said pump; said enclosure having a wall which defines a control panel; said first means is coupled to said pump and mounted to said control panel; third means for supplying hydraulic fluid to said pump and discharging pressured hydraulic fluid from the latter; and said third means is coupled to said pump and mounted to said control panel.

It is further an object of this invention to disclose a portable test unit, as aforesaid, in which said chassis has an underside; and transport-facilitating means is coupled to said underside.

Further objects of this invention, as well as the novel features thereof, will become more apparent by reference to the following description, taken in conjunction with the accompanying figures, in which.

Figure 1:
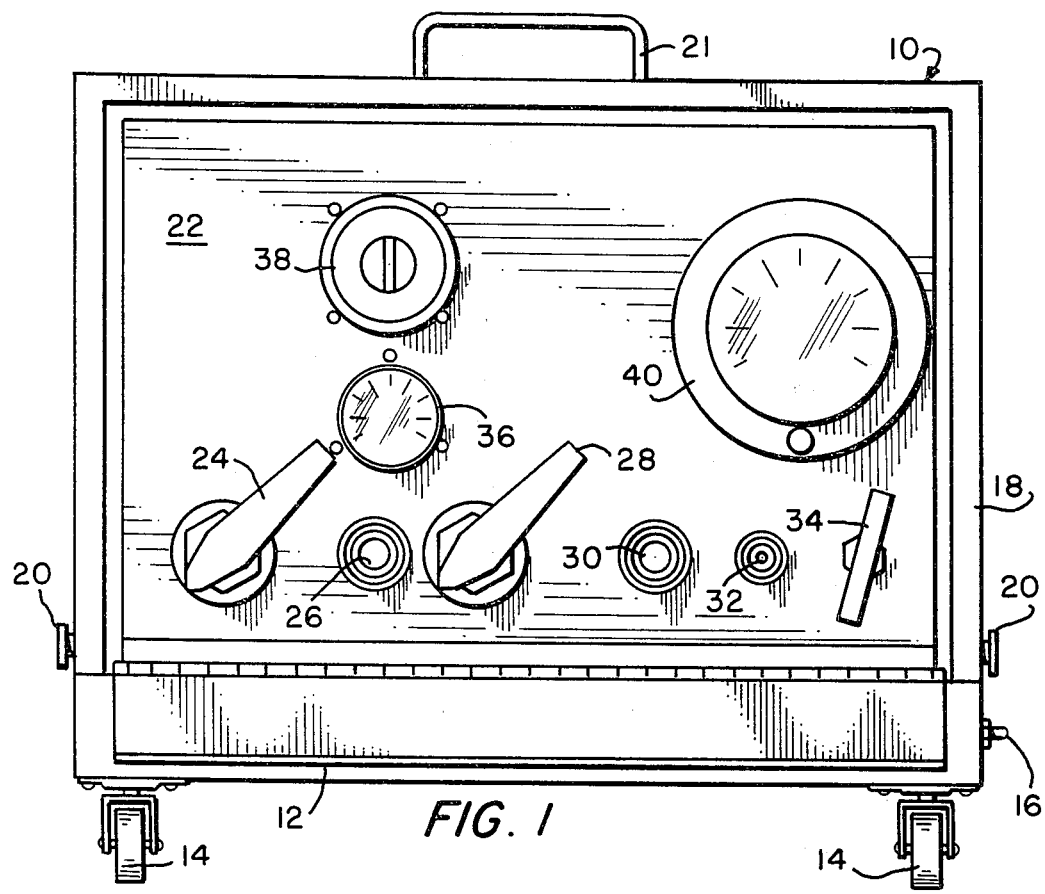
FIG. 1 is a front elevational view of the novel test unit, according to an embodiment thereof.
Figure 2:
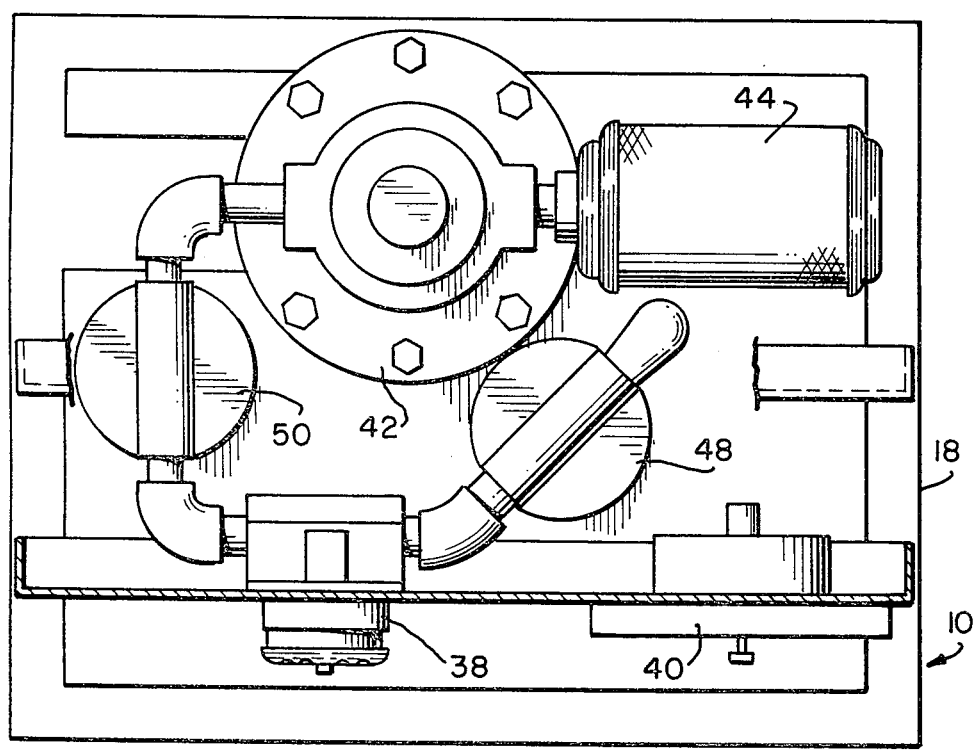
FIG. 2 is a plan view of the unit of FIG. 1, with the enclosure thereof removed.
Figure 3:
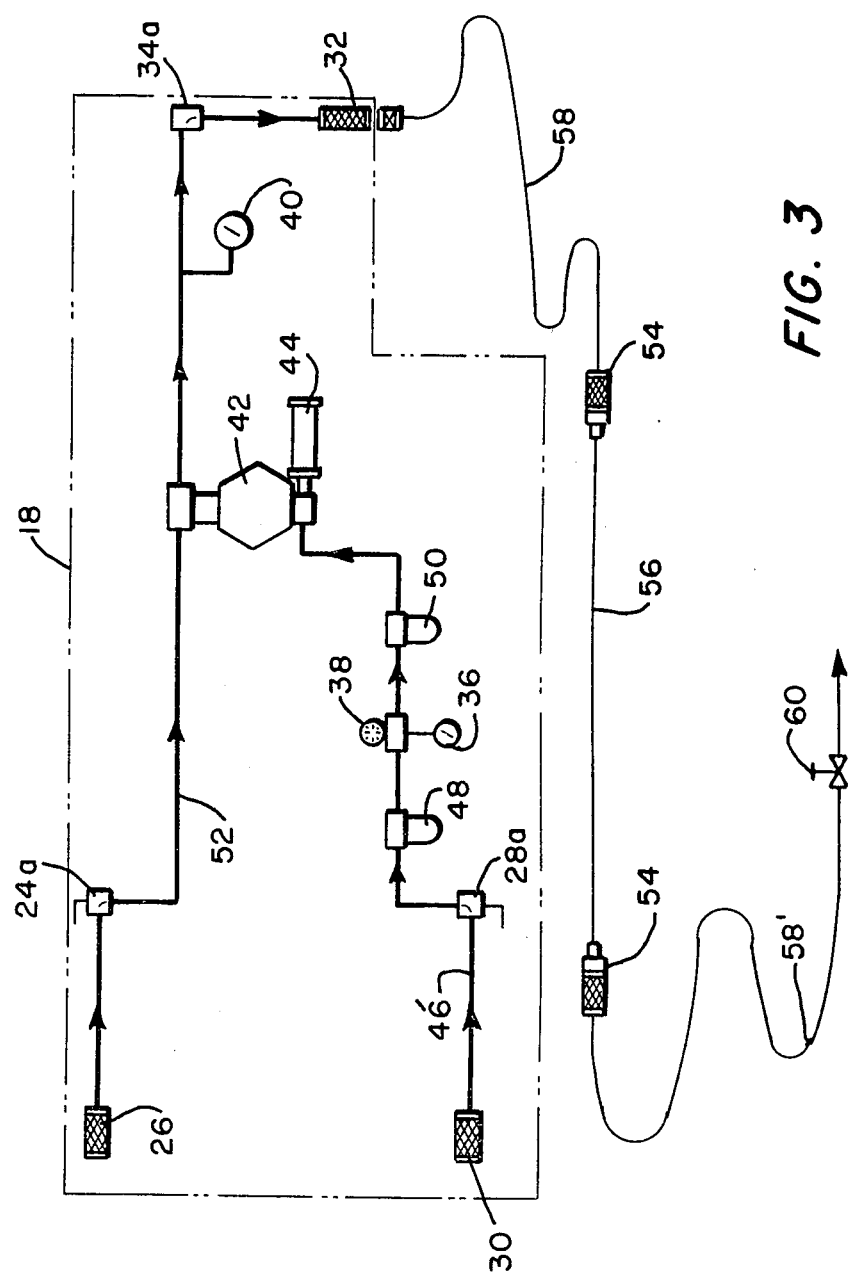
FIG. 3 is a schematic diagram comprising the operative components of the test unit shown in association with a tube under test, test plugs, and interconnecting hose.

As shown in the figures, the novel, portable test unit 10 comprises a chassis 12 which has, on the underside thereof, casters 14, and a tow clip 16 fixed to a side thereof. There are, of course, four casters 14; however only two thereof are shown. The unit comprises an enclosure 18 which is removable from the chassis 12. Knobs 20, which protrude from opposite ends of the unit 10, have inner shanks which engage apertures in the enclosure and the chassis, to secure the former to the latter (the details of which are not shown). By removing the knob shanks from the chassis 12, the enclosure may be lifted free of the chassis by means of a top handle 21.

One wall of the enclosure 18 defines a control panel 22. Mounted in the latter are a water inlet control valve handle 24, a water inlet quick-disconnect aperture 26, an air inlet control valve handle 28, an air inlet quick-disconnect aperture 30, a high-pressure water discharge quick-disconnect aperture 32, a high-pressure water discharge control valve handle 34, an air pressure indicator 36, an air-pressure manual regulator 38, and a high-pressure water pressure indicator 40.

Secured within the enclosure 18 is an air-pressure-operated hydraulic pump 42 having an air-discharge muffler 44 coupled thereto. An air pressure conduit 46 communicates the air inlet quick-disconnect aperture 30 with an air inlet valve 28a; the latter is operated by the handle 28. Conduit 46 further communicates with an air filter 48, the manual regulator 38, the air pressure indicator 36, an automatic air lubricator 50, and finally terminates at the pump 42 and muffler 44.

Also confined within the enclosure 18 is a hydraulic fluid conduit 52. The latter communicates the water inlet quick-disconnect aperture 26 with a water inlet valve 24a; the latter is operated by the handle 24. Conduit 52 further communicates with the pump 42, the water pressure indicator 40, a water discharge valve 34a—which is operated by the handle 34—and terminates at the high-ressure water discharge quick-disconnect aperture 32.

In a manner well known in this technology, test plugs 54 are engaged with the opposite ends of a tube-under-test 56 and high-pressure hoses 58 and 58' for pressure-testing of the test tube 56. The hose 58 is connected to the high-pressure water discharge quick-disconnect aperture 32, a supply of water is provided to the water inlet quick-disconnect aperture 26, and compressed air is supplied to the air inlet quick-disconnect aperture 30. Hose 58' has a drain valve 60 interposed therein.

To use the unit 10 to test the tube 56, the following basic steps are performed. The drain valve 60 is opened and so also is the high-pressure water valve 34a. Next the water inlet valve 24a is opened to establish a flow of water through the pump 42. Next, the regulator 38 is set to "0" pressure. Next, the air inlet valve 28a is opened, and the regulator 38 is adjusted to approximately fifteen psi. When it is determined that the tube 56 has been purged of air, and is filled with water, then the drain valve 60 is closed. Then, the regulator 38 is adjusted for the desired test-pressure. When the latter is achieved, the air inlet and water inlet valves 28a and 24a are closed. The tube 56 will be under the prescribed hydraulic pressure. To de-pressure the arrangement, following the pressure test, the drain valve is opened slowly. In one, compact "package", the unit 10 provides all the components for tube testing, requiring only the supplies of air and water to be connected thereto. The unit is fully mobile. It can be hoisted by the handle 21; it can be towed by the clip 16 by means of a chain or the like. The hose 58 and 58', and plugs 54, can be stored within the enclosure 18, if the latter is made commodious enough, or confined within a companion tool box.

While I have described my invention in connection with a specific embodiment thereof, it is to be clearly understood that this is done only by way of example, and not as a limitation to the scope of my invention as set forth in the objects thereof, and in the appended claims. For instance, the invention comprises a power-operative hydraulic pump 42, and the means for supplying operative power thereto is disclosed as compressed air. However, the scope of the invention is such as to embrace those embodiments thereof which employ motor-driven pumps; in such, then, an electrical conduit, supplying electrical energy to the pump would supplant the conduit 46. Other embodiments may comprise engine-powered or hydraulic-powered pumps. Additionally, in the embodiment depicted herein, the fluid sources are described as air and water. Such need not be the case. The tube-pressurizing fluid may be oil, or the like. Also, if the test environment so dictates, an inert gas, such as nitrogen may be used instead of air. The chassis 12 has casters 14 but, clearly, such could be supplanted by wheels or skids. These, and all other modifications of the invention, as will occur to others from my disclosure, are deemed to be within the scope of my invention and embraced by the appended claims.

I claim:

1. A portable test unit, for high-pressure testing of tubes, comprising:
   a chassis;
   an enclosure removably coupled to said chassis;
   said enclosure having an external control panel;
   said control panel being breached by only three apertures;
   a compressed-air-operative, hydraulic pump confined within said enclosure;
   a first conduit communicating one of said apertures with said pump, within said enclosure;
   a second conduit communicating another of said apertures with said pump, within said enclosure; and
   a third conduit communicating said pump with the third of said apertures, within said enclosure; wherein
   said first and second conduits communicate with said pump in parallel;
   said third conduit communicates with said pump and said third aperture in series with one of said first and second conduits;
   said first conduit defining means for conducting operative compressed air to said pump;
   said second conduit defines means for conducting hydraulic fluid to said pump; and
   said third conduit defines means for conducting hydraulic fluid, under pressure, from said pump to said third aperture; and further including
   valving means, in communication with said first and second conduits, for controlling compressed air and hydraulic fluid conduct between said one and another apertures and said first and second conduits; wherein
   said valving means comprises manual control means, mounted on said control panel, for operating said valving means.

2. A portable test unit, according to claim 1, wherein:
   said three apertures are of the quick-disconnect type.

3. A portable test unit, according to claim 1, further including:
   an air pressure regulator interposed in said first conduit.

4. A portable test unit, according to claim 1, further including:
   an air pressure indicator in communication with said first conduit, said indicator including a visual-display meter; and wherein
   said visual-display meter is mounted on said control panel.

* * * * *